(12) United States Patent
Kenyon et al.

(10) Patent No.: US 7,739,867 B2
(45) Date of Patent: *Jun. 22, 2010

(54) COMPACT, LOW PRESSURE-DROP SHOCK-DRIVEN COMBUSTOR

(75) Inventors: Ross Hartley Kenyon, Cincinnati, OH (US); Venkat Eswarlu Tangirala, Niskayuna, NY (US); Kevin Michael Hinckley, Saratoga Springs, NY (US); Anthony John Dean, Scotia, NY (US); Stephen Daniel Myers, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 1176 days.

This patent is subject to a terminal disclaimer.

(21) Appl. No.: 11/346,714

(22) Filed: Feb. 3, 2006

(65) Prior Publication Data
US 2007/0180832 A1   Aug. 9, 2007

(51) Int. Cl.
*F02K 5/02* (2006.01)
*F02K 7/00* (2006.01)
(52) U.S. Cl. ........................................ 60/247; 60/39.38
(58) Field of Classification Search .................. 60/247, 60/39.38, 39.76, 39.77, 39.821, 776
See application file for complete search history.

(56) References Cited

U.S. PATENT DOCUMENTS

| | | | | |
|---|---|---|---|---|
| 2,689,454 A | * | 9/1954 | Schneider | 60/805 |
| 2,708,341 A | * | 5/1955 | Zucrow | 60/777 |
| 3,005,310 A | * | 10/1961 | Reder | 60/249 |
| 3,175,357 A | * | 3/1965 | Klein | 60/778 |
| 3,263,418 A | * | 8/1966 | Lange et al. | 60/247 |
| 5,473,885 A | | 12/1995 | Hunter, Jr. et al. | |
| 5,802,854 A | * | 9/1998 | Maeda et al. | 60/737 |
| 5,937,635 A | * | 8/1999 | Winfree et al. | 60/39.38 |
| 6,883,543 B2 | * | 4/2005 | Tew et al. | 137/624.13 |
| 6,964,171 B2 | * | 11/2005 | Li et al. | 60/772 |
| 7,131,260 B2 | * | 11/2006 | Dean et al. | 60/39.76 |
| 2007/0180814 A1 | * | 8/2007 | Tangirala et al. | 60/204 |
| 2007/0180815 A1 | * | 8/2007 | Tangirala et al. | 60/247 |

OTHER PUBLICATIONS

U.S. Appl. No. 10/870,877, filed Jun. 18, 2004, Venkat Tangirala, Keith McManus and Anthony Dean.
U.S. Appl. No. 10/870,898, filed Jun. 18, 2004, Venkat Tangirala, Keith McManus and Anthony Dean.

* cited by examiner

*Primary Examiner*—William H Rodríguez
(74) *Attorney, Agent, or Firm*—Penny A. Clarke (57) ABSTRACT

A system for efficiently creating cyclic detonations is provided. The system includes at least a first initiator chamber configured to generate an initial wave, at least one main chamber coupled to the first initiator chamber. The main chamber is configured to generate a main wave and to output products of supersonic combustion. The products are generated within the main chamber. The main chamber is configured to enable the main wave to travel upstream and downstream within the main chamber when the first initiator chamber is located outside the main chamber. The system further includes an initial connection section located between the first initiator chamber and the main chamber that enhances a combustion process via shock focusing and shock reflection.

20 Claims, 9 Drawing Sheets

COMPACT, LOW PRESSURE-DROP SHOCK-DRIVEN COMBUSTOR

BACKGROUND OF THE INVENTION

This invention relates generally to cyclic pulsed detonation combustors (PDCs) and more particularly, to a compact, low pressure drop transition of detonations with small initiation devices.

In a generalized pulse detonation combustor, fuel and oxidizer (e.g., oxygen-containing gas such as air) are admitted to an elongated combustion chamber at an upstream inlet end of the pulse detonation combustor. An igniter (spark or plasma ignitor) is used to initiate a combustion process within the pulse detonation combustor. Following a successful transition to detonation, a detonation wave propagates toward an outlet of the pulse detonation combustor at supersonic speed causing a substantial combustion of the fuel and oxidizer mixture before the mixture can be substantially driven from the outlet. A result of the combustion is to rapidly elevate pressure within the pulse detonation combustor before a substantial amount of gas can escape through the outlet. An effect of this inertial confinement is to produce near constant volume combustion. The pulse detonation combustor can be used to produce pure thrust or can be integrated in a gas-turbine engine. The former is generally termed a pure thrust-producing device and the latter is generally a hybrid engine device. A pure thrust-producing device is often used in a subsonic or supersonic propulsion vehicle system, such as, rockets, missiles, and an afterburner of a turbojet engine. Industrial gas turbines are often used to provide output power to drive an electrical generator or motor. Other types of gas turbines may be used as aircraft engines, on-site and supplemental power generators, and for other applications.

A deflagration-to-detonation transition (DDT) process begins when a mixture of fuel and air in the chamber is ignited via a spark, laser or other source. A subsonic flame kernel generated from the ignition accelerates as the subsonic flame travels along the length of the chamber due to chemical processes and flow mechanics. As the subsonic flame reaches critical supersonic speeds, "hot spots" are created that create localized explosions, eventually transitioning the subsonic flame to a super-sonic detonation wave. The DDT process can take up to several meters of the length of the chamber, and efforts have been made to reduce the distance used for DDT by using internal obstacles, such as orifice plates or spirals, in the flow of a mixture of fuel and oxidizer within the chamber. However, the obstacles for cyclic detonation devices have a relatively high pressure drop and are cooled. Moreover, the detonation initiation, in the chamber with obstacles, occurs within a run-up length which ranges from and including 15 to 20 times a diameter of the chamber, and thus the run-up length increases with increasing chamber diameter. For practical propulsion systems, the run-up length due to this constraint can be prohibitively long.

BRIEF DESCRIPTION OF THE INVENTION

In one aspect, a system for efficiently creating cyclic detonations is provided. The system includes at least a first initiator chamber configured to generate an initial wave, at least one main chamber coupled to the first initiator chamber. The main chamber is configured to generate a main wave and to output products of supersonic combustion. The products are generated within the main chamber. The main chamber is configured to enable the main wave to travel upstream and downstream within the main chamber when the first initiator chamber is located outside the main chamber. The system further includes an initial connection section located between the first initiator chamber and the main chamber that enhances a combustion process via shock focusing and shock reflection.

In another aspect, a system for generating power is described. The system includes an oxidizer supply system comprising a compressor configured to compress an oxidizer, a fuel supply system comprising a pump configured to pressurize fuel, at least a first initiator coupled to the oxidizer supply and the fuel supply system, and configured to generate an initial wave. The system further includes a main chamber coupled to the first initiator chamber. The main chamber is configured to generate a main wave, and configured to receive oxidizer from the compressor and fuel from the pump, where the main chamber is configured to output power generated from the initial wave generated within the first initiator chamber. The main chamber is configured to enable the main wave to travel upstream and downstream within the main chamber when the first initiator chamber is located outside the main chamber.

In yet another aspect, a method for generating power is described. The method includes coupling a main chamber to a first initiator chamber, generating an initial wave within the first initiator chamber, generating a main wave within the main chamber, configuring the main wave to travel upstream and downstream within the main chamber upon configuring the first initiator chamber to be located outside the main chamber, and outputting from the main chamber thrust generated from the initial wave.

DETAILED DESCRIPTION OF THE INVENTION

A shock-to-detonation Transition (SDT) can be used to initiate detonations in a large combustion chamber by transitioning a supersonic flame or a detonation wave, which is generated in an ignitor with a small diameter, into a larger main chamber filled with fuel-oxidizer mixture. In the SDT process, one or more initiators generate a supersonic flame or a detonation wave using a deflagration-to-detonation transition (DDT) process, which is then transitioned to a larger chamber using a carefully positioned reflecting and shock-focusing surface. The resulting supersonic flame or detonation wave propagates through the larger main chamber consuming a fuel-air mixture within the larger main chamber. In general, the SDT process makes detonation transition from a smaller chamber to a larger chamber possible, and a run-up time and a run-up length used for this transition are much smaller when compared to the DDT process occurring in a chamber.

A pulse detonation combustor (PDC) includes a device or system that produces pressure rise, temperature rise and velocity increase from a series of repeating detonations or quasi-detonations within the device. A quasi-detonation includes a supersonic turbulent combustion process that produces pressure rise, temperature rise and velocity increase higher than pressure rise, temperature rise and velocity increase produced by a deflagration wave. Embodiments of PDCs include a fuel injection system, an oxidizer flow system, a means of igniting a fuel/oxidizer mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation (cross-fire). The geometry of the PDC is such that the pressure rise of the detonation wave expels combustion products, such as combustion gases, out the pulse detonation combustor exhaust to produce a thrust force. Pulse detonation combustion can be accomplished in a number of types of PDCs including shock tubes, resonating detonation cavities and tubular/tuboannular/annular combustors. As used herein, the term "chamber" includes pipes having circular or non-circular cross-sections and having constant or varying cross sections. Exemplary chambers include cylindrical tubes, as well as tubes having polygonal cross-sections, for example hexagonal tubes.

Figure 1:
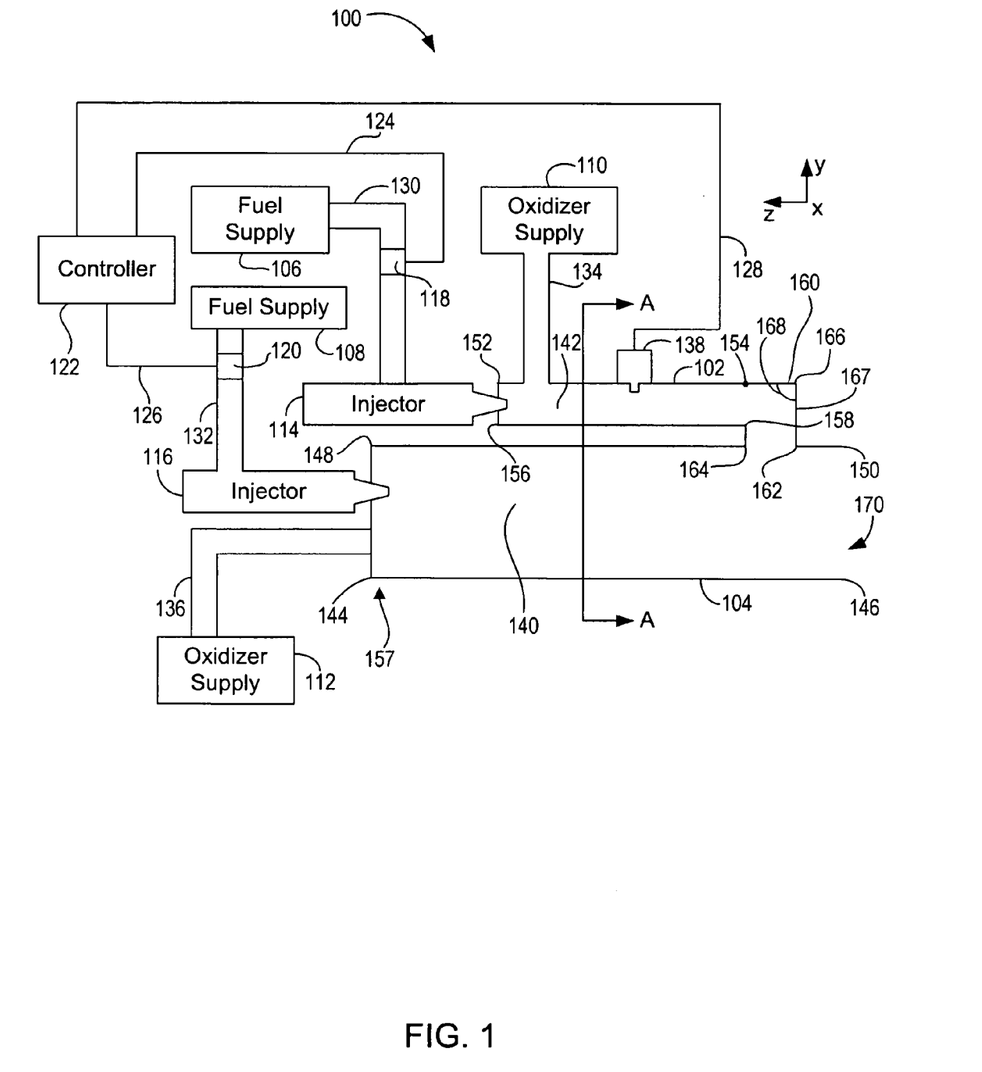
FIG. 1 is a block diagram of an exemplary embodiment of a system for efficiently creating cyclic detonations.
Figure 2:
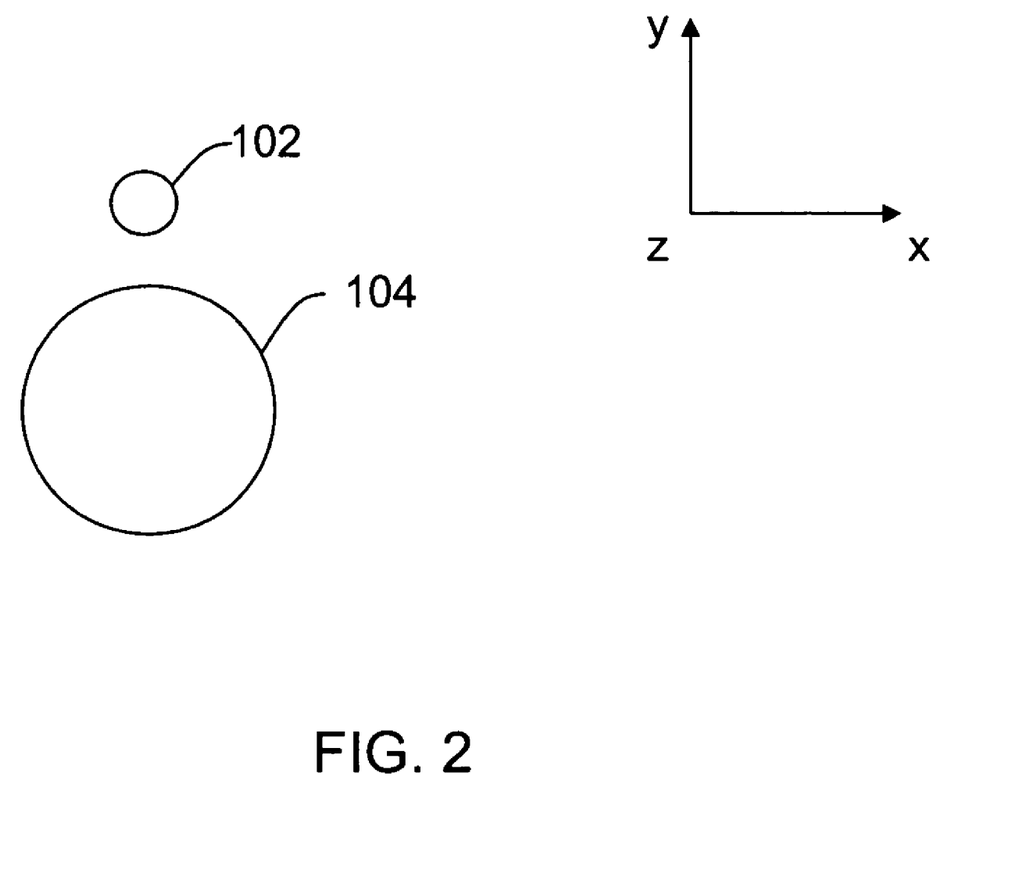
FIG. 2 shows a cross-section of an embodiment of a main chamber and an initial initiator chamber included within the system of FIG. 1.

FIG. 1 is a block diagram of an exemplary embodiment of a system 100 for efficiently creating cyclic detonations. Examples that use cyclic detonations include systems to produce a propulsive force and thrust. System 100 includes an initial initiator chamber 102, a main chamber 104, a plurality of fuel supplies 106 and 108, a plurality of oxidizer supplies 110 and 112, a plurality of fuel injectors 114 and 116, a plurality of valves 118 and 120, a controller 122, a plurality of controller output lines 124, 126, and 128, a plurality of fuel supply lines 130 and 132, a plurality of oxidizer supply lines 134 and 136, and an initial initiation device 138. A cross-section of main chamber 104 and initial initiator chamber 102 along a line A-A is shown in FIG. 2. As an example, a length to diameter ratio of main chamber 104 ranges from 0.5 to 5. Initial initiator chamber 102 is located outside main chamber 104.

Referring back to FIG. 1, main chamber 104 includes a hollow gap 140 and initial chamber includes a hollow gap 142. As used herein, the term "controller" is not limited to just those integrated circuits referred to in the art as a controller, but broadly refers to a processor, a microprocessor, a microcontroller, a programmable logic controller, an application specific integrated circuit, and another programmable circuit.

Each of fuel supplies 106 and 108 may be a tank that stores fuel, such as a liquid fuel, such as, but not limited to, gasoline, diesel fuel, butane, pentane, hexane, jet fuel (JP 10), or Jet-A fuel. In an alternative embodiment, fuel supply 106 stores gaseous fuel, such as ethylene or hydrogen. In one embodiment, each oxidizer supply 110 and 112 is an air tank that stores air. In an alternative embodiment, oxidizer supply 110 and 112 can include air from atmosphere or can include exhaust air from an engine, such as a turbine engine.

Examples of each of fuel injectors 114 and 116 include, but are not limited to being, an effervescent atomizer, a flash vaporizing injector, a pressure-assist atomizer, an air-assist atomizer, and a supercritical liquid injector. Each of valves 118 and 120 includes a solenoid valve. Initial initiation device 138 can be, but is not limited to being, a spark plug, a plasma igniter, and/or a laser source. In the exemplary embodiment, each controller output line 124, 126, and 128 is a conducting medium, such as a metal wire.

Main chamber 104 extends from a point 144 to a point 146, extends from a point 148 to a point 150, and extends from point 144 to point 148. Initial initiator chamber 102 extends from a point 152 to a point 154, extends from a point 156 to a point 158, and extends from point 152 to point 156. Points 144 and 148 are closer to a head-end 157 of main chamber 104 than points 146 and 150. Initial initiator chamber 102 is coupled to main chamber 104 via an initial transition or initial connection section 160 that extends from point 154 to a point 162 and from point 158 to point 164. Main chamber 104 does not include obstacles, such as, an orifice plate, a spiral, a portion of initial initiator chamber 102, and a portion of initial connection section 160. In one embodiment, a length of main chamber 104 between points 150 and 162 is longer than a length of main chamber 104 between points 148 and 164. In another embodiment, a length of main chamber 104 between points 150 and 162 is the same as a length of main chamber 104 between points 148 and 164. The length of main chamber 104 is measured substantially parallel to a z-axis.

Initial connection section 160 is integrated with main chamber 104. For example, initial connection section 160 is attached to and located outside main chamber 104. Each of initial initiator chamber 102, main chamber 104, and initial connection section 160 are fabricated from a metal, such as stainless steel or aluminum. Main chamber 104 is parallel to initial initiator chamber 102. Alternatively, main chamber 104 is not parallel to initial initiator chamber 102. For example, main chamber 104 forms an angle ranging from zero degrees to 179 degrees within initial initiator chamber 102. In another alternative embodiment, initial initiator chamber 102 may have a spiral shape or has a zigzag shape. Main chamber 104 is coupled, such as bolted or welded, to initial connection section 160 and initial connection section 160 is coupled, such as bolted or welded, to initial initiator chamber 102.

The shape of the initial connection section 160 is configured to enhance shock reflection and shock focusing to enhance initiation in the main chamber 104. Initial connection section 160 includes a sharp edge 166 forming an angle 168 ranging from five degrees to and including 90 degrees between initial initiator chamber 102 and a side 167 of initial connection section 160. Alternatively, initial connection section 160 includes a curved edge instead of or in addition to sharp edge 166. In another alternative embodiment, initial connection section 160 includes a recessed cone or a paraboloid instead of or in addition to sharp edge 166. In another alternative embodiment, initial connection section 160 includes more than one, such as between 2 and 5, sharp edges. Initial connection section 160 is a piece other than main chamber 104 and initial initiator chamber 102.

Controller 122 sends an "on" signal via controller output line 124 to valve 118 and an "on" signal via controller output line 126 to valve 120. Upon receiving an "on" signal from controller 122, valve 118 actuates or opens. Similarly, upon receiving an "on" signal via controller output line 124, valve 120 actuates or opens. When valve 118 is open, fuel stored within fuel supply 106 is supplied via fuel supply line 130 to fuel injector 114. Fuel injector 114 atomizes fuel received via fuel supply line 130 into a plurality of droplets and supplies the droplets to initial initiator chamber 102. Alternatively, if fuel injector 114 is not included within system 100, fuel, such as liquid or gaseous fuel, is supplied from fuel supply line 130 to initial initiator chamber 102. Fuel is supplied from fuel supply 106 to initial initiator chamber 102 in a pulsed manner at a specific frequency or alternatively is continuously supplied to initial initiator chamber 102 for a specific period of time. Additionally, a flow of oxidizer is supplied from oxidizer supply 110 via oxidizer supply line 134 to initial initiator chamber 102.

Fuel is supplied from fuel supply 108 to main chamber 104 continuously for a period of time. Additionally, a flow of oxidizer is supplied from oxidizer supply 112 via oxidizer supply line 136 to main chamber 104. When valve 120 is open, fuel from fuel supply 108 is supplied via fuel supply line 132 to fuel injector 116, where the fuel is atomized into a plurality of droplets, which are channeled into main chamber 104.

After determining that a pre-determined amount of time has passed since valves 118 and 120 were opened, controller 122 transmits an "off" signal to valve 118 via controller output line 124 and an "off" signal to valve 120 via controller output line 126. Valves 118 and 120 close upon receiving "off" signals. Supply of fuel to main chamber 104 and to initial initiator chamber 102 stops upon closure of valves 118 and 120. In an alternative embodiment, controller 122 does not transmit an "off" signal to close valve 120. In the alternative embodiment, valve 120 remains open during each cycle of generation of a wave within initial initiation chamber 102.

Controller 122 sends a signal to initial initiation device 138 via controller output line 128. Upon receiving the signal via controller output line 128, initial initiation device 138 creates a spark within initial initiator chamber 102. The spark within initial initiator chamber 102 ignites a mixture of fuel and oxidizer within initial initiator chamber 102 to generate an ignition kernel. The timing of the spark created within initial initiation chamber 102 can be before or after the valves 118 and 120 receive 'off' signals from controller 122. The ignition kernel within initial initiator chamber 102 expands into a deflagration flame that accelerates into a turbulent flame and an initial wave, such as a shock wave, a quasi-detonation wave, or a detonation wave, within initial initiator chamber 102. The initial wave within initial initiator chamber 102 propagates through a mixture of fuel and oxidizer within initial initiator chamber 102 to increase the pressure within initial initiator chamber 102.

The initial wave generated within initial initiator chamber 102 travels from initial initiator chamber 102 via initial connection section 160 to main chamber 104. Initial connection section 160 may have a reflective surface that is designed to focus and/or reflect the initial wave towards main chamber 102. The oxidizer and fuel mixture within main chamber 104 is ignited by the initial wave generated within initial initiator chamber 102. The oxidizer and fuel mixture within main chamber 104 is ignited to generate a main wave within main chamber 104. The main wave has a near sonic velocity, such as ranging from Mach 0.8 to Mach 1, or a supersonic velocity. The main wave travels upstream towards an end 169 of main chamber 102 and also travels downstream towards an end 170 of main chamber 102. End 169 is located opposite to end 170. The main wave generated within main chamber 104 propagates through a mixture of fuel and oxidizer within main chamber 104 to increase the pressure within main chamber 104. The combustion gases formed within main chamber 104 exit main chamber 104 via end 170 of main chamber 104 to generate thrust and or power. End 170 is open to enable the combustion gases generated within main chamber 104 to exit main chamber 102 via end 170 and end 169 is closed to prevent the combustion gases from exiting main chamber 102 via end 169.

Figure 3:
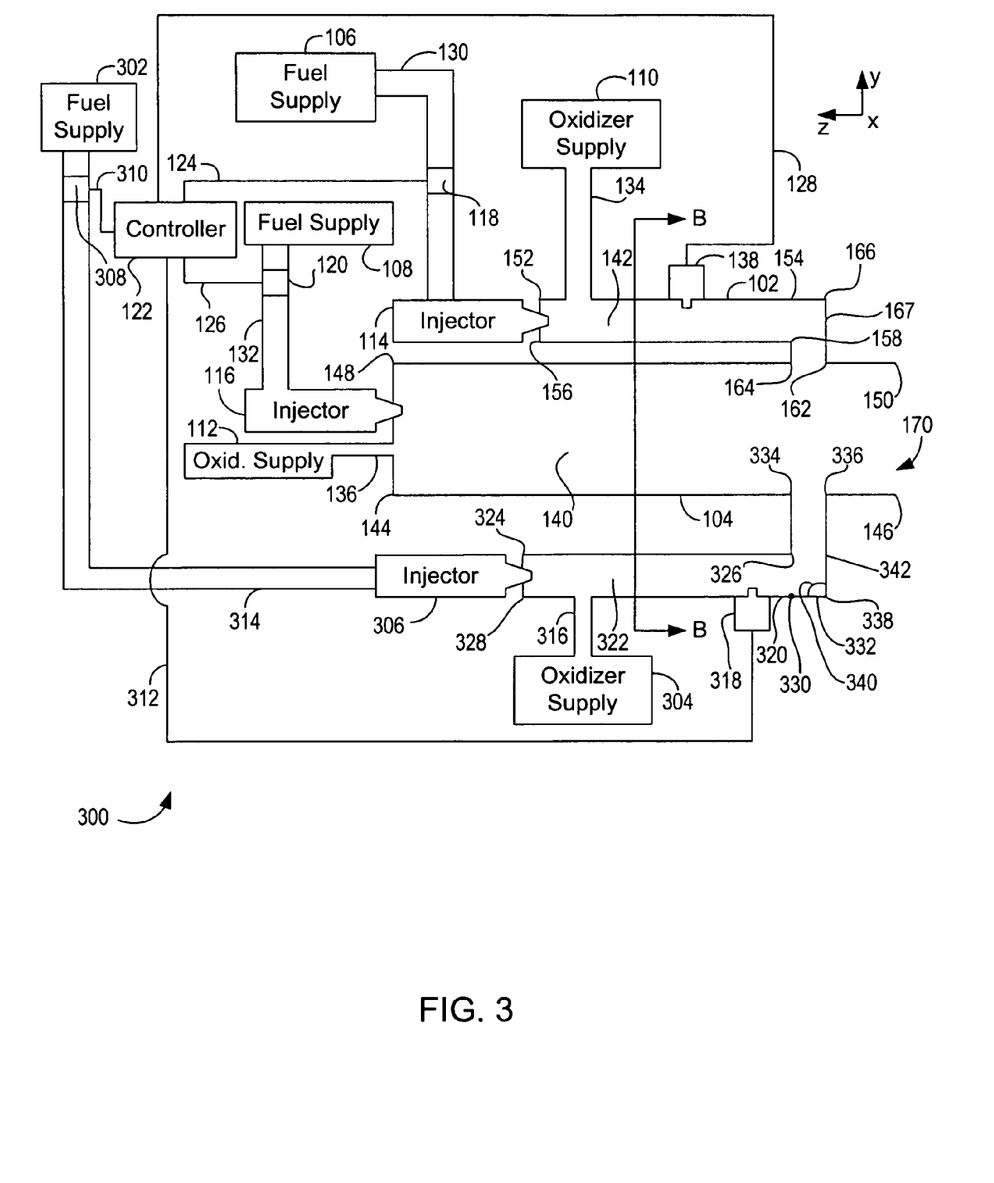
FIG. 3 is a block diagram of another exemplary embodiment of a system for efficiently creating cyclic detonations.
Figure 4:
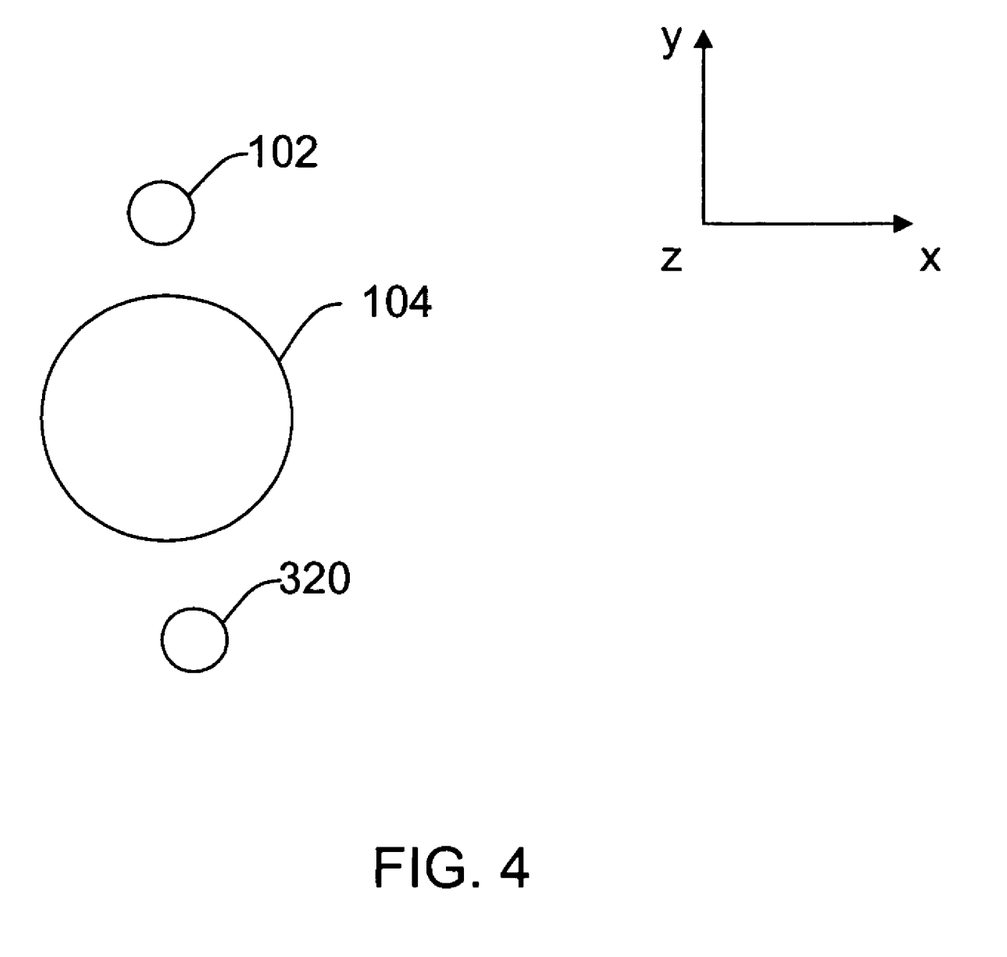
FIG. 4 shows a cross-section of the main chamber, the initial initiator chamber, and an additional initiator chamber included within the system of FIG. 3.
Figure 5:
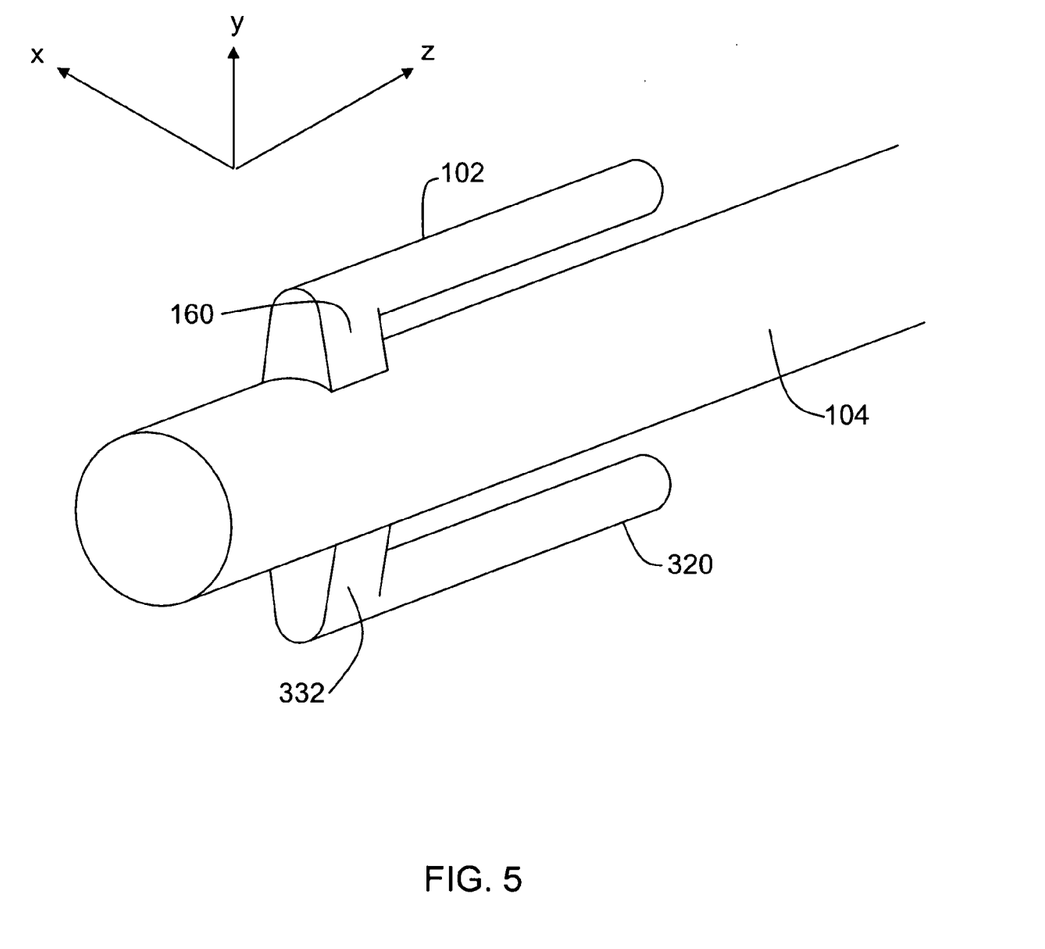
FIG. 5 shows an isometric view of the main chamber, the initial initiator chamber, and the additional initiator chamber.

FIG. 3 is a block diagram of another exemplary embodiment of a system 300 for generating power. System 300 includes initial initiator chamber 102, main chamber 104, fuel supplies 106 and 108, a fuel supply 302, oxidizer supplies 110 and 112, an oxidizer supply 304, fuel injectors 114 and 116, a fuel injector 306, valves 118 and 120 and a valve 308, controller 122, controller output lines 124, 126, and 128, a plurality of controller output lines 310 and 312, fuel supply lines 130 and 132, a fuel supply line 314, oxidizer supply lines 134 and 136, an oxidizer supply line 316, initial initiation device 138, an additional initiation device 318, and an additional initiator chamber 320. Additional initiator chamber 320 is located outside main chamber 104. In one embodiment, main chamber 104 has the same diameter as at least one of initial initiator chamber 102 and additional initiator chamber 320. In an alternative embodiment, main chamber 104 has a larger diameter than at least one of initial initiator chamber 102 and additional initiator chamber 320. In another alternative embodiment, main chamber 104 has a smaller diameter than at least one of initial initiator chamber 102 and additional initiator chamber 320. Fuel supply 302 may be a tank that stores fuel, such as the liquid fuel. In an alternative embodiment, fuel supply 302 stores gaseous fuel. In an alternative embodiment, system 300 may not include fuel injector 306. Additional initiator chamber 320 includes a hollow gap 322. A cross-section of main chamber 104, initial initiator chamber 102, and additional initiator chamber 320 along a line B-B is shown in FIG. 4. Moreover, an isometric view of main chamber 104, initial initiator chamber 102, and additional initiator chamber 320 is shown in FIG. 5.

Referring back to FIG. 3, oxidizer supply 304 is an oxidizer tank that stores oxidizer. In an alternative embodiment, oxidizer supply 304 can include air from atmosphere or can include exhaust air from an engine, such as a turbine engine. Fuel injector 306 includes, but is not limited to being, an effervescent atomizer, a flash vaporizing injector, a pressure-assist atomizer, an air-assist atomizer, and a supercritical liquid injector. Valve 308 includes a solenoid valve. Additional initiation device 318 can be, but is not limited to being, a spark plug, a plasma igniter, and/or a laser source. In the exemplary embodiment, each controller output line 310 and 312 is a conducting medium, such as a metal wire.

Additional initiator chamber 320 extends from a point 324 to a point 326, extends from a point 328 to a point 330, and extends from point 324 to point 328. Additional initiator chamber 320 is coupled to main chamber 104 via an transition section or additional connection section 332 that extends from point 326 to a point 334 and from point 330 to a point 336. The shape of the additional connection section 332 is configured to enhance shock reflection and shock focusing to enhance initiation in the main chamber 104. Additional connection section 332 is integrated with main chamber 104. For example, additional connection section 332 is attached to and located outside main chamber 104. Main chamber 104 does not include other obstacles, such as, a portion of additional initiator chamber 320 and a portion of additional connection section 332. Additional connection section 332 is a piece other than main chamber 104 and additional initiator chamber 320. Additional initiator chamber 320 and additional connection section 332 are fabricated from a metal, such as stainless steel or aluminum. Main chamber 104 is parallel to additional initiator chamber 320. Alternatively, main chamber 104 is not parallel to additional initiator chamber 320. For example, main chamber 104 forms an angle ranging from zero degrees to 179 degrees within additional initiator chamber 320. In another alternative embodiment, additional initiator chamber 320 may have a spiral shape or has a zigzag shape. Main chamber 104 is coupled, such as bolted or welded, to additional connection section 332 and additional connection section 332 is coupled, such as bolted or welded, to additional initiator chamber 320.

Additional connection section 332 includes a sharp edge 338 forming an angle 340 ranging from five degrees to and including 90 degrees between additional initiator chamber 320 and a side 342 of additional connection section 332. Alternatively, additional connection section 332 includes a curved edge instead of or in addition to sharp edge 338. In another alternative embodiment, additional connection section 332 includes a recessed cone instead of or in addition to sharp edge 338. In yet another alternative embodiment, additional connection section 332 includes a paraboloid instead of or in addition to sharp edge 338. In another alternative embodiment, additional connection section 332 includes more than one, such as between 2 and 5, sharp edges.

Controller 122 sends an "on" signal via controller output line 310 to valve 308. Upon receiving an "on" signal from controller 122, valve 308 actuates or opens. When valve 308 is open, fuel stored within fuel supply 302 is supplied via fuel supply line 314 to fuel injector 306. Fuel injector 306 atomizes fuel received via fuel supply line 314 into a plurality of droplets and supplies the droplets to additional initiator chamber 320. Alternatively, if fuel injector 306 is not included within system 300, fuel, such as liquid or gaseous fuel, is supplied from fuel supply line 314 to additional initiator chamber 320. Fuel is supplied from fuel supply 302 to additional initiator chamber 320 in a pulsed manner at a certain frequency or alternatively is continuously supplied to additional initiator chamber 320 for a period of time. Additionally, a flow of oxidizer is supplied from oxidizer supply 304 via oxidizer supply line 316 to additional initiator chamber 320.

After determining that an amount of time has passed since valve 308 was opened, controller 122 transmits an "off" signal to valve 308 via controller output line 310. Valve 308 closes upon receiving an "off" signal. Supply of fuel to additional initiator chamber 320 stops upon closure of valve 308. In an alternative embodiment, controller 122 does not transmit an "off" signal to close valve 308. In the alternative embodiment, valve 308 remains open during each cycle of generation of a wave within additional initiation chamber 320.

Controller 122 sends a signal to additional initiation device 318 via controller output line 312. Upon receiving the signal via controller output line 312, additional initiation device 318 creates a spark within additional initiator chamber 320. In one embodiment, the spark within additional initiator chamber 320 is created at the same time at which the spark within initial initiator chamber 102 is created. For example, controller 122 sends a signal to initial initiation device 138 at the same time at which controller 122 sends a signal to additional initiation device 318. In an alternative embodiment, the spark within initial initiator chamber 102 is generated at a different time than a time at which the spark within additional initiator chamber 320 is generated. As an example, the sparks within initial initiator chamber 102 and additional initiator chamber 320 are alternated by creating the spark within initial initiator chamber 102 at a first time, creating a spark within additional initiator chamber 320 at a second time following the first time, and creating a spark within initial initiator chamber 102 at a third time following the second time. As another example, the sparks within initial initiator chamber 102 and additional initiator chamber 320 are alternated by creating the spark within initial initiator chamber 102 at the first time, creating a spark within additional initiator chamber 320 at the second time consecutive to the first time, and creating a spark within initial initiator chamber 102 at the third time consecutive to the second time. As yet another example, the spark within initial initiator chamber 102 is repeated at a first period and the spark within additional initiator chamber 320 is repeated at a second period, where a time of repetition of the first period does not coincide with a time of repetition of the second period. As yet another example, controller 122 sends a signal to initial initiation device 138 at a different time than a time of sending a signal to additional initiation device 318. The timing of the spark created within additional initiation chamber 320 can be before or after the valves 308 and 120 receive 'off' signals from controller 122.

The spark within additional initiator chamber 320 ignites a mixture of fuel and oxidizer within additional initiator chamber 320 to generate an ignition kernel. The ignition kernel within additional initiator chamber 320 expands into a deflagration flame that accelerates into a turbulent flame and an additional wave, such as a shock wave, a quasi-detonation wave, or a detonation wave, within additional initiator chamber 320. The additional wave generated within additional initiator chamber 320 propagates through a mixture of fuel and oxidizer within additional initiator chamber 320 to increase the pressure within additional initiator chamber 320.

The additional wave generated within additional initiator chamber 320 travels from additional initiator chamber 320 via additional connection section 332 to main chamber 104. Additional connection section 332 is designed to focus and/or reflect the additional wave towards main chamber 102. The oxidizer and fuel mixture within main chamber 104 is ignited by the additional wave generated within additional initiator chamber 320 and the initial wave generated within initial initiator chamber 102. Alternatively, the liquid fuel received from fuel injector 306 is transformed into a gaseous form within main chamber 104 by the initial wave generated within initial initiator chamber 102, and the oxidizer and fuel mixture within main chamber 104 is ignited by the additional wave generated within additional initiator chamber 320. In another alternative embodiment, the liquid fuel received from fuel injector 306 is transformed into a gaseous form by the initial wave generated within initial initiator chamber 10 and is conditioned for detonation by the initial wave. The oxidizer and fuel mixture within main chamber 104 is ignited by the initial and additional waves from initial initiator chamber 102 and additional initiator chamber 320 to generate the main wave within main chamber 104, and the combustion gases formed within main chamber 104 exit main chamber 104 via end 170 of main chamber 104 to generate thrust and or power.

It is noted that system 300 may include more than one additional initiator chamber 320. For example, system 300 includes three additional initiator chambers and initial initiator chamber 102.

Figure 6:
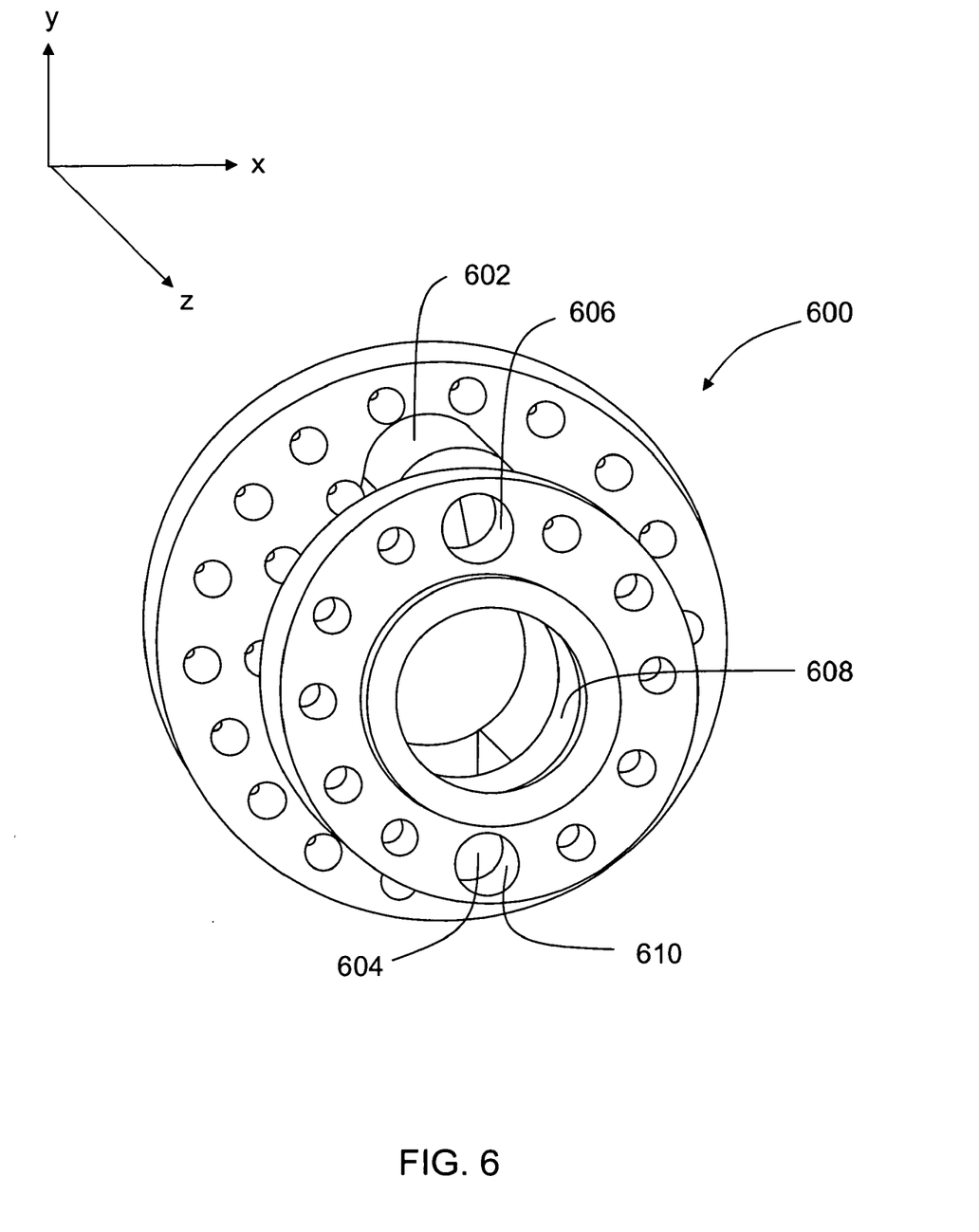
FIG. 6 shows an isometric view of a system including a plurality of connection sections included within the system of FIG. 3.

FIG. 6 shows an isometric view of a system 600 including a plurality of connection sections 602 and 604. Connection section 602 is an example of initial connection section 160 and connection section 604 is an example of additional connection section 332. System 600 includes a plurality of ports 606, 608, and 610. Initial initiator chamber 102 is attached, such as welded or bolted, to port 606 and additional initiator chamber 320 is attached, such as welded or bolted, to port 610. Main chamber 104 is attached, such as welded or bolted, to port 608. Main chamber 104 is coupled to initial initiator chamber 102 via connection section 602 and is coupled to additional initiator chamber 320 via connection section 604.

It is noted that any of main chamber 104, initial initiator chamber 102, and additional initiator chamber 320 may include a liner and a coolant. The coolant flows between the liner and a side wall of any of main chamber 104, initial initiator chamber 102, and additional initiator chamber 320.

Figure 7:
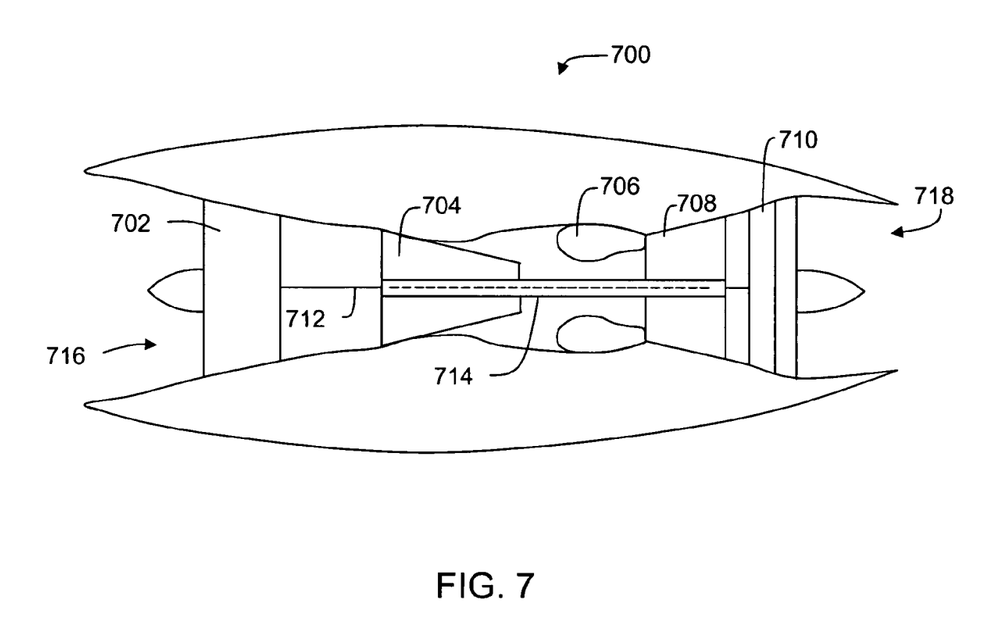
FIG. 7 is a schematic of an exemplary gas turbine engine including at least one of the systems of FIGS. 1 and 3.

FIG. 7 is a schematic of an exemplary gas turbine engine 700 including a low pressure compressor 702, a high pressure compressor 704, and a pressure-rised combustion system 706. Engine 700 also includes a high pressure turbine 708 and a low pressure turbine 710. Low pressure compressor 702 and low pressure turbine 710 are coupled by a first shaft 712, and high pressure compressor 704 and high pressure turbine 708 are coupled by a second shaft 714. In one embodiment, engine 700 is a F110-129 engine available from General Electric Aircraft Engines, Cincinnati, Ohio. Pressure-rised combustion system 706 includes at least one system 100 except that the at least one system 100 is controlled by controller 122. Alternatively, pressure-rised combustion system 706 includes at least one system 300 except that the at least one system 300 is controlled by controller 122.

In operation, air flows through low pressure compressor 702 from an inlet side 716 of engine 700 and is supplied from low pressure compressor 702 to high pressure compressor 704 to generate compressed air. Compressed air is delivered to any of oxidizer supply lines 134, 136, and oxidizer supply line 316. In an alternative embodiment, air is supplied to any of oxidizer supply lines 134, 136, and oxidizer supply line 316 from low pressure compressor 702. In another alternative embodiment, air is supplied to any of oxidizer supply lines 134, 136, and oxidizer supply line 316 from low pressure turbine 710. In yet another alternative embodiment, air is supplied to any of oxidizer supply lines 134, 136, and oxidizer supply line 316 from a combination of low pressure compressor 702 and low pressure turbine 710. Similarly, in still another alternative embodiment, air is supplied to any of oxidizer supply lines 134, 136, and oxidizer supply line 316 from at least one of high pressure compressor 704 and high pressure turbine 708.

Compressed air is mixed with fuel, such as fuel pressurized by a pump, and ignited to generate the combustion gases. The combustion gases generated within pressure-rised combustion system 706 are channeled from pressure-rised combustion system 706 to drive turbines 708 and 710 and provide thrust from an outlet 718 of engine 700. In an alternative embodiment, any of systems 100 and 300 can be, but are not limited to being, used for other propulsion applications, such as, rocket boosters, rocket engines, missiles, and an unmanned combat aerial vehicle (UCAV).

Figure 8:
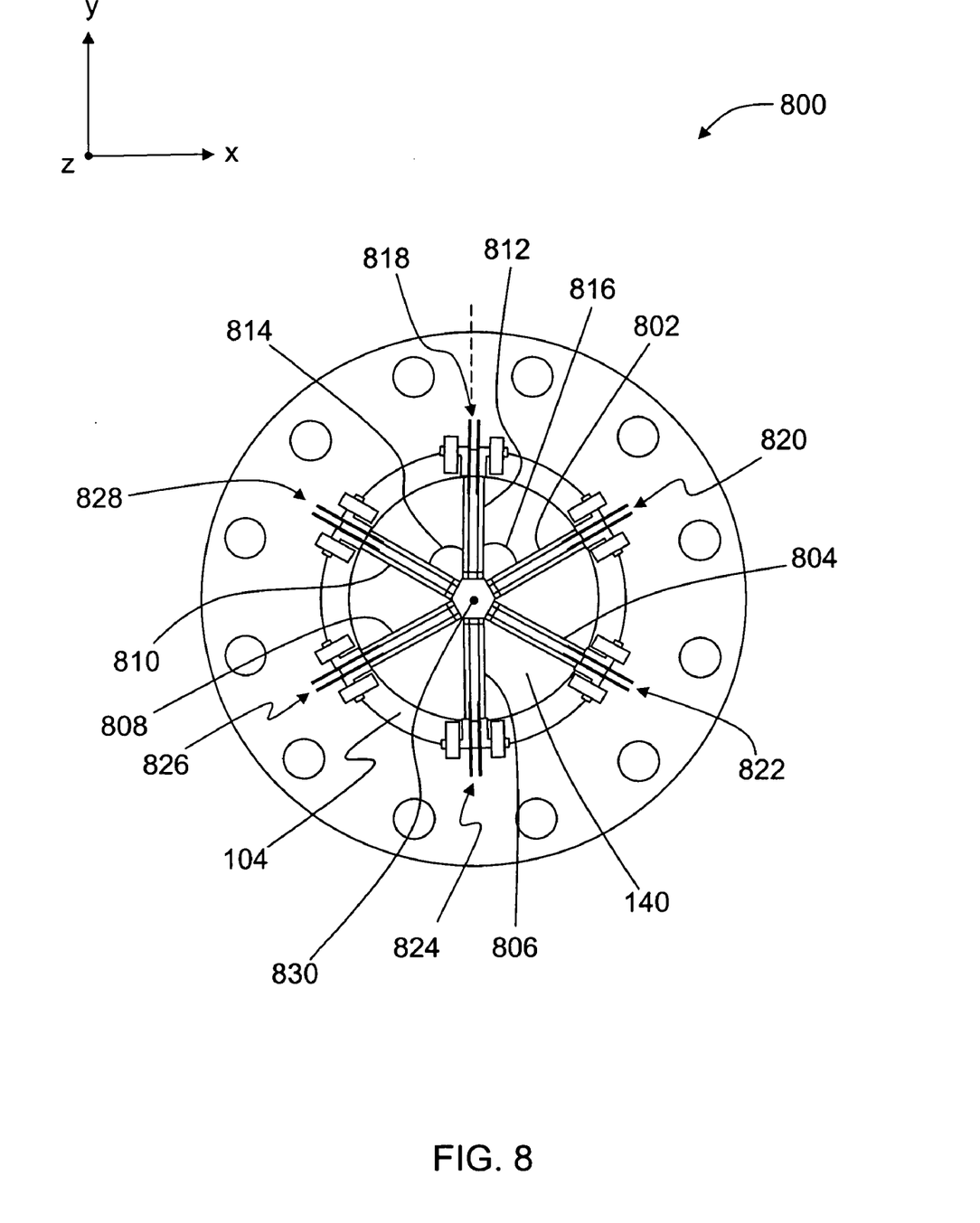
FIG. 8 is a schematic diagram of an embodiment of a system for injection a fuel and oxidizer mixture within the main chamber.

FIG. 8 is a schematic diagram of an embodiment of a system 800 for injecting a fuel and oxidizer mixture within main chamber 104. A plurality of struts 802, 804, 806, 808, 810, and 812 are arranged radially along a circumference of main chamber 104. Struts 802, 804, 806, 808, 810, and 812 are arranged radially at head end 157 of main chamber 104. Struts 802, 804, 806, 808, 810, and 812 are parallel to an xy plane formed by an x-axis and a y-axis. Alternatively, struts 802, 804, 806, 808, 810, and 812 may not be parallel to the xy plane. A plurality of angles between struts 802, 804, 806, 808, 810, and 812 are equal. As an example, an angle 814 between struts 810 and 812 is equal to an angle 816 between struts 802 and 812. In an alternative embodiment, the plurality of angles between struts 802, 804, 806, 808, 810, and 812 are unequal. For example, angle 814 is unequal to angle 816. In another alternative embodiment, any number of struts, such as, 2, 3, 4, 8, 9, or 10, can be arranged radially to inject a mixture of fuel and oxidizer into main chamber 104.

Struts 802, 804, 806, 808, 810, and 812 are radially arranged to facilitate a radial injection of a mixture of fuel and oxidizer into main chamber 104. A mixture of fuel and oxidizer is radially injected into main chamber 104 via an opening or port 818 of strut 802, an opening or port 820 of strut 804, an opening or port 822 of strut 806, an opening or port 824 of strut 808, an opening or port 826 of strut 810, and an opening or port 828 of strut 812. The radial injection of fuel within main chamber 104 can be synchronous with an injection of fuel into one of initial initiation chamber 102 and additional initiation chamber 320. The radial injection of fuel generates a finely atomized spray resulting in a uniform mixture of fuel and oxidizer within main chamber 104. Moreover, the radial injection concentrates fuel at a point 830, such as a center, of main chamber 104. The radial injection can be continuous or alternatively periodic, such as pulsed.

Figure 9:
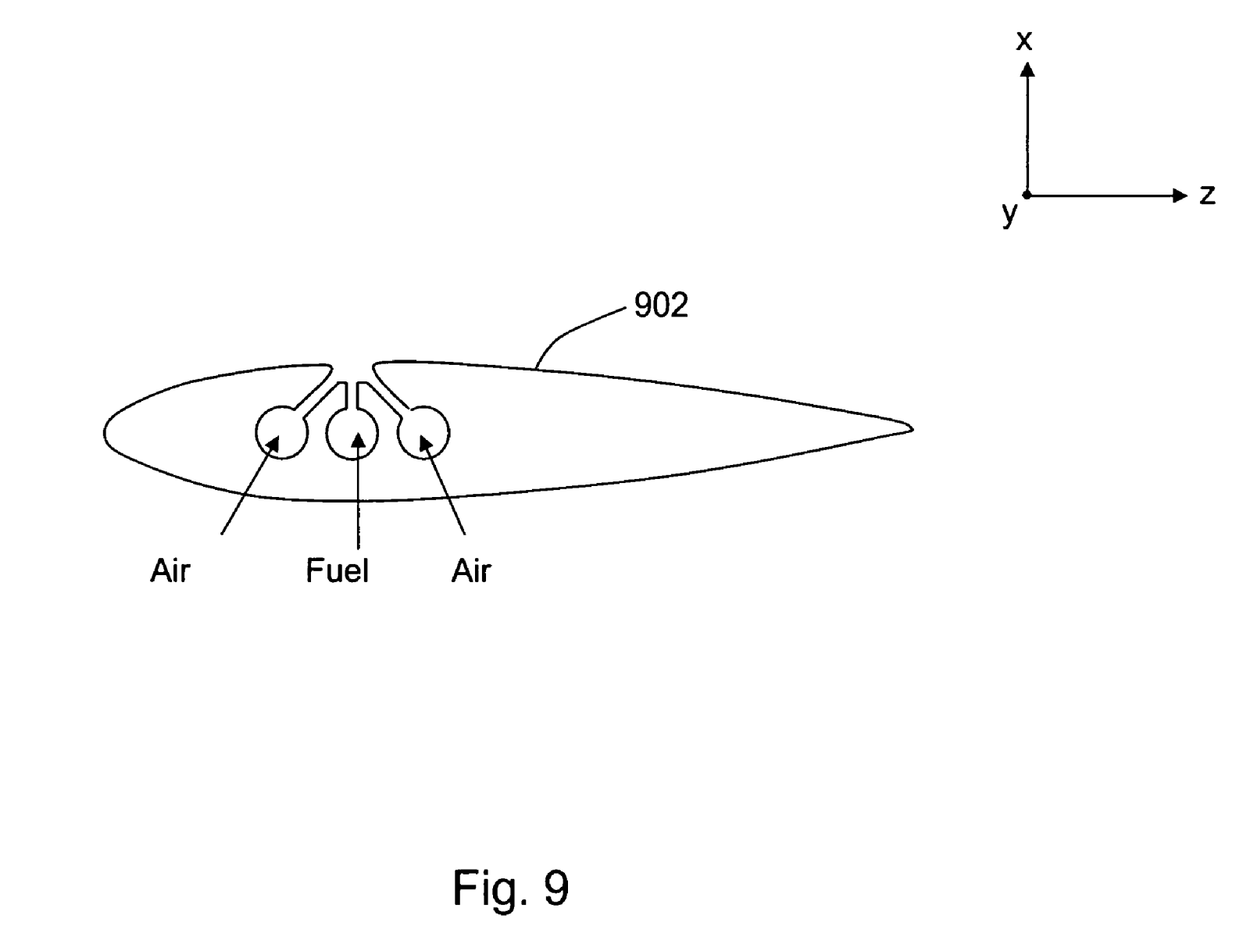
FIG. 9 illustrates an embodiment of a strut for injecting fuel within the main chamber.

FIG. 9 illustrates an embodiment of a strut 902, which is an example of one of struts 802, 804, 806, 808, 810, and 812. Strut 902 has an airfoil shape that minimizes a drag experienced by a mixture of fuel and oxidizer flowing within strut 902.

Technical effects of the herein described systems and methods for generating power include foregoing using an initiation device to directly ignite the mixture of fuel and oxidizer within main chamber 104. Other technical effects include using shock reflection and shock focusing to raise the temperature and pressure within the connection section 160 and main chamber 104. This causes the mixture of fuel and oxidizer to ignite within a short initiation delay ranging from and including 0.1 millisecond (ms) to 5 ms, and propagate at supersonic speeds. This short initiation delay is caused because of the high temperature and pressure of the fuel-air mixture in the high amount of initiation energy. Further technical effects include assisting in a break-up of a plurality of droplet of the liquid fuel within main chamber 104 and conditioning the droplets for detonation. Still further technical effects include achieving a repetitive or cyclical frequency of generation of the main wave within main chamber 104. An example of the cyclical frequency includes a range between 0 to 100 Hertz. Other technical effects include providing a substantially unobstructed flow of the main wave within main chamber 104. Location of at least one of initial initiator chamber 102, additional initiator chamber 320, initial connection section 160, and additional connection section 332 outside main chamber 104 facilitates the unobstructed flow.

While the invention has been described in terms of various specific embodiments, those skilled in the art will recognize that the invention can be practiced with modification within the spirit and scope of the claims.

What is claimed is:

1. A system for efficiently creating cyclic detonations, said system comprising:

at least a first initiator chamber configured to generate an initial wave;

at least one main chamber coupled to said first initiator chamber, wherein said main chamber configured to generate a main wave and to output products of supersonic combustion, the products are generated within the main chamber, and said main chamber configured to enable the main wave to travel upstream and downstream within said main chamber, and said first initiator chamber is located outside said main chamber;

an initial connection section located between the first initiator chamber and the main chamber that enhances a combustion process via shock focusing and shock reflection.

2. A system in accordance with claim 1 wherein said first initiator chamber is configured to generate the initial wave including at least one of a shock wave, a quasi-detonation wave, and a detonation wave.

3. A system in accordance with claim 1 wherein said initial connection section couples said main chamber with said first initiator chamber, and said initial connection section is located outside said main chamber.

4. A system in accordance with claim 1 wherein said main chamber does not include an obstacle for the main wave to travel upstream and downstream within said main chamber.

5. A system in accordance with claim 1 further comprising a second initiator chamber coupled to said main chamber and configured to generate an additional wave within said second initiator chamber, wherein the additional wave includes at least one of a shock wave, a quasi-detonation wave, and a detonation wave.

6. A system in accordance with claim 1 further comprising a second initiator chamber coupled to said main chamber and configured to generate an additional wave within said second initiator chamber, wherein said main chamber is configured to receive the additional wave.

7. A system in accordance with claim 1 further comprising:
a second initiator chamber coupled to said main chamber and configured to generate an additional wave within said second initiator chamber;
an initial initiation device; and
an additional initiation device, wherein said initial initiation device configured to generate a spark within said first initiator chamber at a time of generation of a spark within said second initiator chamber by said additional initiation device.

8. A system in accordance with claim 1 further comprising:
a second initiator chamber coupled to said main chamber and configured to generate an additional wave within said second initiator chamber;
an initial initiation device; and
an additional initiation device, wherein said initial initiation device configured to generate a spark within said first initiator chamber at a different time than a time of generation of a spark within said second initiator chamber by said additional initial device.

9. A system in accordance with claim 1 further comprising a plurality of struts configured to inject fuel radially into said main chamber and concentrate fuel at a point within said main chamber.

10. A system for generating power, said system comprising:
an oxidizer supply system comprising a compressor configured to compress an oxidizer;
a fuel supply system comprising a pump configured to pressurize fuel;
at least a first initiator coupled to said oxidizer supply and said fuel supply system, and configured to generate an initial wave; and
a main chamber coupled to said first initiator chamber, configured to generate a main wave, and configured to receive oxidizer from said compressor and fuel from said pump, wherein said main chamber configured to output power generated from the initial wave generated within said first initiator chamber, and said main chamber configured to enable the main wave to travel upstream and downstream within said main chamber, and said first initiator chamber is located outside said main chamber.

11. A system in accordance with claim 10 wherein said first initiator chamber is configured to generate a detonation shock wave.

12. A system in accordance with claim 10 further comprising an initiation device configured to ignite a mixture of fuel and oxidizer within said first initiator chamber to generate the initial wave.

13. A system in accordance with claim 10 wherein said main chamber is configured to receive a mixture of fuel and oxidizer, said main chamber further configured to ignite the mixture within said main chamber by using the initial wave.

14. A system in accordance with claim 10 further comprising a second initiator chamber coupled to said main chamber and configured to generate an additional wave within said second initiator chamber.

15. A system in accordance with claim 10 further comprising a second initiator chamber coupled to said main chamber and configured to generate an additional wave within said second initiator chamber, wherein said main chamber configured to receive the additional wave.

16. A system in accordance with claim 10 further comprising:
a second initiator chamber coupled to said main chamber and configured to generate an additional wave within said second initiator chamber;
an initial initiation device; and
an additional initiation device, wherein said initial initiation device configured to generate a spark within said first initiator chamber at a time of generation of a spark within said second initiator chamber by said additional initial device.

17. A method for generating power, said method comprising:
coupling a main chamber to a first initiator chamber;
generating an initial wave within the first initiator chamber;
generating a main wave within the main chamber;
configuring the main wave to travel upstream and downstream within the main chamber upon configuring the first initiator chamber to be located outside the main chamber; and
outputting from the main chamber thrust generated from the initial wave.

18. A method in accordance with claim 17 wherein generating the initial wave comprises generating a detonation shock wave.

19. A method in accordance with claim 17 wherein said generating the initial wave comprises producing the initial wave upon igniting a mixture of fuel and oxidizer within said first initiator chamber.

20. A method in accordance with claim 17 further comprising:
receiving a mixture of fuel and oxidizer within said main chamber; and
igniting via the initial wave the mixture within said main chamber.

* * * * *